(12) United States Patent
Bhalerao et al.

(10) Patent No.: US 9,642,489 B2
(45) Date of Patent: May 9, 2017

(54) DISPENSER FOR PRODUCING BEVERAGES BY DISSOLUTION OF A SOLUBLE INGREDIENT

(75) Inventors: Amol Ashok Bhalerao, Dublin, OH (US); David J. Harrison, New Milford, CT (US)

(73) Assignee: Nestec S.A., Vevey (CH)

(*) Notice: Subject to any disclaimer, the term of this patent is extended or adjusted under 35 U.S.C. 154(b) by 308 days.

(21) Appl. No.: 14/369,757

(22) PCT Filed: Dec. 29, 2011

(86) PCT No.: PCT/US2011/067779
§ 371 (c)(1),
(2), (4) Date: Sep. 9, 2014

(87) PCT Pub. No.: WO2013/101033
PCT Pub. Date: Jul. 4, 2013

(65) Prior Publication Data
US 2014/0377428 A1 Dec. 25, 2014

(51) Int. Cl.
*A23F 5/26* (2006.01)
*A47J 31/46* (2006.01)
(Continued)

(52) U.S. Cl.
CPC ............... *A47J 31/46* (2013.01); *A23F 3/16* (2013.01); *A23F 5/26* (2013.01); *A23L 2/00* (2013.01);
(Continued)

(58) Field of Classification Search
CPC ........ A47J 31/46; A47J 31/401; A47J 31/405; A47J 31/00; A47J 31/10; A23F 3/16; A23L 2/38; A23L 2/00; A23L 5/26
See application file for complete search history.

(56) References Cited

U.S. PATENT DOCUMENTS 3,354,811 A * 11/1967 King ............... A47J 31/408
99/282
3,385,569 A * 5/1968 Bookout ........... A47J 31/401
222/129.4
(Continued)

FOREIGN PATENT DOCUMENTS

CA 2080415 * 5/1993
EP 2085001 8/2009
(Continued)

OTHER PUBLICATIONS

International Preliminary Report on Patentability for International Application No. PCT/US2011/067779 mailed Jul. 10, 2014.
(Continued)

*Primary Examiner* — Anthony Weier
(74) *Attorney, Agent, or Firm* — K&L Gates LLP (57) ABSTRACT

The invention concerns a beverage production device (10) having a first dissolution chamber (1), said first dissolution chamber being configured for producing a beverage by mixing a beverage concentrate and a diluent and having: —at least one diluent inlet (11a, 11b) and—at least one liquid delivery outlet (12), —a bottom wall (13), the at least one liquid delivery outlet (12) being set in said bottom wall, wherein the device has a second dilution chamber (2), said second dilution chamber having: —a top wall (21), and—at least one liquid inlet (22) through the top wall, said liquid inlet being the liquid delivery outlet (12) of the first dissolution chamber, and—at least one diluent inlet (23) configured for introducing a diluent in the second dilution chamber and mixing said diluent with the liquid flowing from the at least one liquid inlet (22) through the top wall.

24 Claims, 6 Drawing Sheets

(51) Int. Cl.
*A23F 3/16* (2006.01)
*A47J 31/00* (2006.01)
*A47J 31/10* (2006.01)
*A47J 31/40* (2006.01)
*A23L 2/00* (2006.01)
*A23L 2/38* (2006.01)

(52) U.S. Cl.
CPC ............. *A23L 2/38* (2013.01); *A47J 31/00* (2013.01); *A47J 31/10* (2013.01); *A47J 31/401* (2013.01); *A47J 31/405* (2013.01)

(56) References Cited

U.S. PATENT DOCUMENTS

| | | | | |
|---|---|---|---|---|
| 3,641,918 A * | 2/1972 | Schellgell | ............ | A47J 31/007 99/279 |
| 3,876,186 A * | 4/1975 | Walter | .................. | B01F 7/162 366/265 |
| RE30,301 E * | 6/1980 | Zygiel | .................. | G05D 11/03 137/101.11 |
| 4,579,048 A * | 4/1986 | Stover | .................. | A47J 31/002 99/280 |
| 4,649,809 A * | 3/1987 | Kanezashi | ............ | A47J 31/007 141/104 |
| 4,718,579 A | 1/1988 | Brody et al. | | |
| 5,192,002 A * | 3/1993 | Reese | .................. | G07F 13/065 222/108 |
| 5,490,448 A * | 2/1996 | Weller | .................. | A47J 31/002 99/295 |
| 8,230,778 B2 * | 7/2012 | Piscaer | .................. | A47J 31/401 99/323.1 |
| 2004/0194629 A1 * | 10/2004 | Jones | .................. | A47J 31/402 99/275 |
| 2011/0045152 A1 * | 2/2011 | Stutz | .................... | A47J 31/002 426/433 |
| 2014/0150665 A1 * | 6/2014 | Pearson | ............... | B67D 1/0029 99/295 |

FOREIGN PATENT DOCUMENTS

| | | |
|---|---|---|
| WO | WO03082066 | 10/2003 |
| WO | WO2008071613 | 6/2008 |
| WO | WO2011157759 | 12/2011 |

OTHER PUBLICATIONS

International Search Report for International Application No. PCT/US2011/067779 dated Aug. 13, 2012.

* cited by examiner

DISPENSER FOR PRODUCING BEVERAGES BY DISSOLUTION OF A SOLUBLE INGREDIENT

CROSS REFERENCE TO RELATED APPLICATIONS

The present application is a National Stage of International Application No. PCT/US2011/067779, filed on Dec. 29, 2011, the entire contents of which are being incorporated herein by reference.

FIELD OF THE INVENTION

The present invention relates to an assembly of mixing chambers for producing beverages by dissolution of a soluble beverage ingredient

BACKGROUND OF THE INVENTION

WO 2008/071613 describes a beverage machine preparing beverage by dissolution of a soluble beverage ingredient with a diluent in a whipperless mixing chamber. The advantages of the chamber consist in that it enables the production of either a frothed short beverage—in particular an espresso coffee with a layer of crema on the top of the beverage—or alternatively a long cup without foam like a long black coffee cup. Another advantage is that this mixing chamber comprises less number of parts compared to existing mixing devices featuring mechanical agitation and guarantees a better hygiene.

Yet the above mixing chamber does not enable the production of very long drinks or even a carafe of beverage for foodservice application where the high dispense speed of drinks of important volumes is very critical.

There is consequently a need for improving said whipperless mixing chamber so that it can produce beverage of very different sizes from the espresso to the carafe in a short delivery time.

There is also a need to for improving said whipperless mixing chamber so that long cup or carafe drink can be produced with foam on their top.

The object of the present invention is to propose an improved whipperless mixing chamber configured for providing alternatively espresso, long cup or carafe with or without foam.

SUMMARY OF THE INVENTION

According to a first aspect, the invention concerns a beverage production device comprising a first dissolution chamber, said first dissolution chamber being configured for producing a beverage by mixing a beverage concentrate and a diluent and comprising:
  at least one diluent inlet,
  at least one liquid delivery outlet,
  a bottom wall, the at least one liquid delivery outlet being set in said bottom wall, wherein the device comprises a second dilution chamber, said second dilution chamber comprising:
  a top wall, and
  at least one liquid inlet through the top wall, said liquid inlet being the liquid delivery outlet of the first dissolution chamber, and
  at least one diluent inlet configured for introducing a diluent in the second dilution chamber and mixing said diluent with the liquid flowing from the at least one liquid inlet through the top wall.

Preferably in the second dilution chamber the at least one diluent inlet is closed to the at least one liquid inlet through the top wall.

In a specific embodiment the second dilution chamber can comprise several diluent inlets positioned around the at least one liquid inlet through the top wall.

According to the preferred embodiment the second dilution chamber can be surrounded by an annular chamber comprising at least one diluent inlet and at least one diluent outlet connected to the at least one diluent inlet of the second dilution chamber. This annular chamber is configured for distributing a diluent from a diluent supply in the at least one diluent outlet of the annular chamber.

Preferably the annular chamber comprises several diluent outlets connected to the several diluent inlets uniformly positioned around the at least one liquid inlet through the top wall of the second dilution chamber.

According to the preferred embodiment, for each diluent outlet of the annular chamber connected to a diluent inlet positioned around the liquid inlet of the second dilution chamber, the section of the diluent outlet is smaller than the section of the diluent inlet.

According to a specific embodiment the liquid delivery outlet of the first dissolution chamber presents a cross shape section. The second dilution chamber can comprise four diluent inlets uniformly positioned between the cross axes of the liquid delivery outlet cross shape section.

According to a specific embodiment the first dissolution chamber and the second dissolution chamber are made of one single piece of material.

Preferably the first dissolution chamber is configured for producing and frothing a beverage.

The first dissolution chamber can comprise a longitudinal upward wall, the at least one diluent inlet being provided through said upward wall and dimensioned and oriented for directing a jet of diluent in the first dissolution chamber, and wherein the at least one liquid delivery outlet in the bottom wall is configured for enabling liquid to rise up along the side of the upward wall by the jet of diluent entering the chamber.

Preferably the total surface area of the at least one liquid delivery outlet of the first dissolution chamber is determined so that the evacuation flow rate by gravity of the liquid through said at least one outlet is lower than the filling flow rate of the first dissolution chamber in diluent through the at least one diluent inlet.

According to a preferred embodiment the first dissolution chamber comprises:
  a sieve placed at least partially across the first dissolution chamber,
  two diluent inlets placed at different heights of the chamber upward wall,
    a first diluent inlet,
    a second diluent inlet placed below the first inlet and facing the sieve.

Preferably the second diluent inlet facing the sieve is horizontally oriented.

The sieve can be inclined according to an angle of at least 20° vertical.

The sieve can be removable from the dissolution chamber.

According to a preferred embodiment the first dissolution chamber can comprise a cover that is preferably removable.

According to a particular embodiment the cover can comprise a beverage concentrate inlet.

According to another particular embodiment the first dissolution chamber can comprise a cover and the sieve can be attached to the cover. The sieve can be removable from the chamber.

According to a second aspect, the invention concerns a method for producing a beverage comprising:
providing a beverage production device such as described hereabove,
dosing the first dissolution chamber with beverage concentrate,
feeding a diluent through at least one of the diluent inlet of the first dissolution chamber to dissolve it into a concentrated beverage and
feeding a diluent through the at least one diluent inlet of the second dilution chamber, then
stopping the diluent intake inside the first and the second chambers and draining the beverage.

According to a preferred embodiment the liquid flow delivered out of the first dissolution chamber can be controlled in such a manner that the liquid can rise up a certain level along the side of the chamber upward wall when diluent is fed in the first chamber. This control of the liquid flow delivered out of the first dissolution chamber usually consists in delaying the liquid flow out of the chamber relative to the intake of diluent inside the chamber. The liquid can then form a sheared surface of liquid which is impacted with high energy by the at least one jet of diluent as a result of the direction and dimension of the at least one diluent inlet in the chamber::corresponds to the teaching of Barista chamber.

According to a preferred mode the diluent is simultaneously fed through the first and the second chambers. According to this mode, the step for feeding the diluent though the second chamber begins with some time delay compared to the step for feeding the diluent though the first chamber.

According to a specific embodiment the method can be reproduced several times to produce a carafe drink.

According to the preferred embodiment the beverage concentrate is a soluble coffee ingredient that can be either a powder or a liquid.

The method can comprise a further step of rinsing the chamber by passing diluent through the at least one diluent inlet of the first dissolution chamber after draining of the beverage and further draining the rinsing liquid.

BRIEF DESCRIPTION OF THE DRAWINGS

The characteristics and advantages of the invention will be better understood in relation to.

DETAILED DESCRIPTION OF THE DRAWINGS

Figure 1:
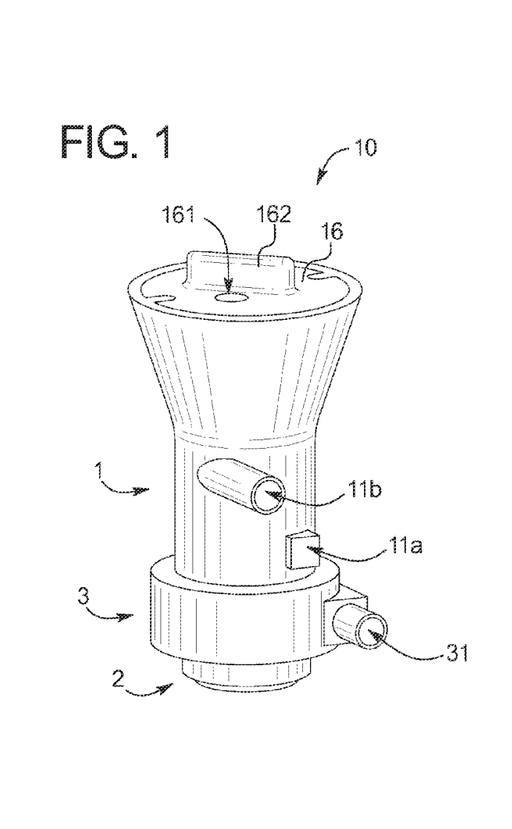
FIG. 1 is a perspective view of a beverage production device according to the present invention.
Figure 2A:
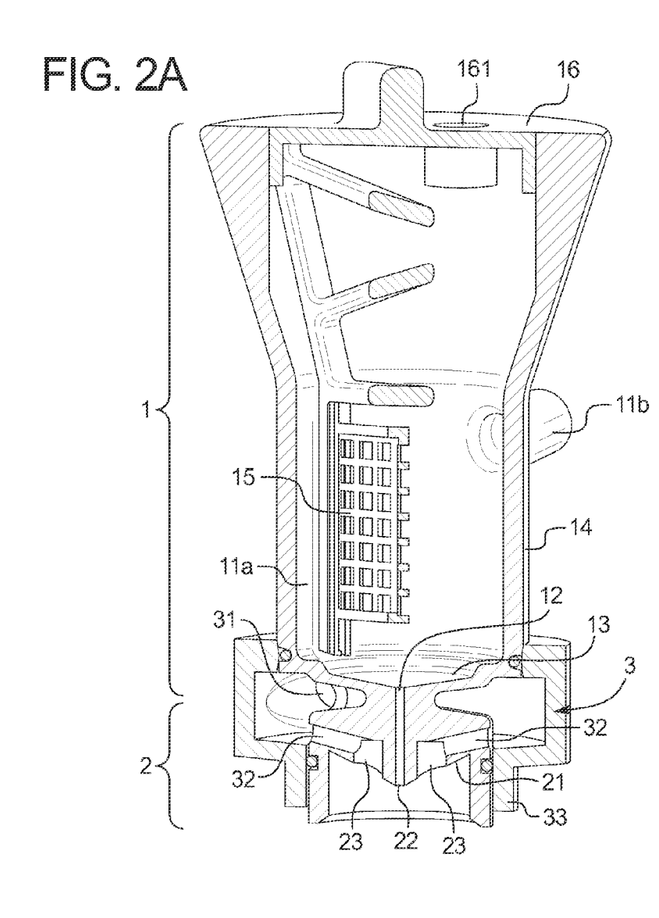
FIG. 2A is a section view of the beverage production device of FIG. 1.

FIGS. 1 and 2A illustrate a beverage production device 10 according to the present invention. The device 10 comprises a first dissolution chamber 1, said first dissolution chamber being configured for producing a beverage by mixing a beverage concentrate and a diluent. The first dissolution chamber 1 comprises two diluent inlets 11a, 11b positioned in the longitudinal upward wall 14 of the chamber and one liquid delivery outlet 12 set in the bottom wall 13 of the dissolution chamber 1. The diluent inlets 11a, 11b are dimensioned and oriented for directing jets of diluent in the first dissolution chamber. The dissolution chamber 1 also comprises a sieve 15 placed across the internal volume of the first dissolution chamber. The two diluent inlets are placed at different heights of the chamber upward wall 14: the first diluent inlet 11b is placed above or in front of the sieve 15 and the second diluent inlet 11a is placed at a lower height than the first diluent inlet 11a and faces the sieve 15. Preferably the second diluent inlet 11a that faces the sieve 15 is horizontally oriented. The liquid delivery outlet 12 in the bottom wall 13 is configured for enabling liquid to rise up along the side of the upward wall 14 by the jets of diluent entering the chamber. Preferably the total surface area of the liquid delivery outlet 12 of the first chamber 1 is determined so that the evacuation flow rate by gravity of the liquid through said at least one outlet is lower than the filling flow rate of the first chamber 1 in diluent through the diluent inlets 11a, 11b. The device 10 also comprises a cover 16 in which is pierced an inlet 161 for introducing a concentrate, preferably a liquid concentrate. The sieve 15 is attached to the cover 16 and can consequently be removed from the chamber 1 when the cover is 16 is removed. A handle 162 on the cover can help for this removal. The sieve 15 can then be easily removed for cleaning.

Figure 2B:
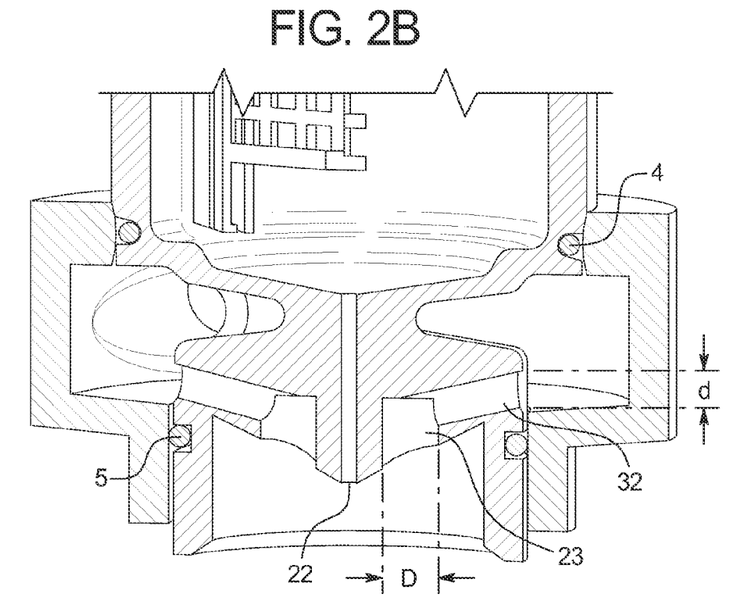
FIG. 2B is a magnified view of the bottom of FIG. 2.
Figure 2C:
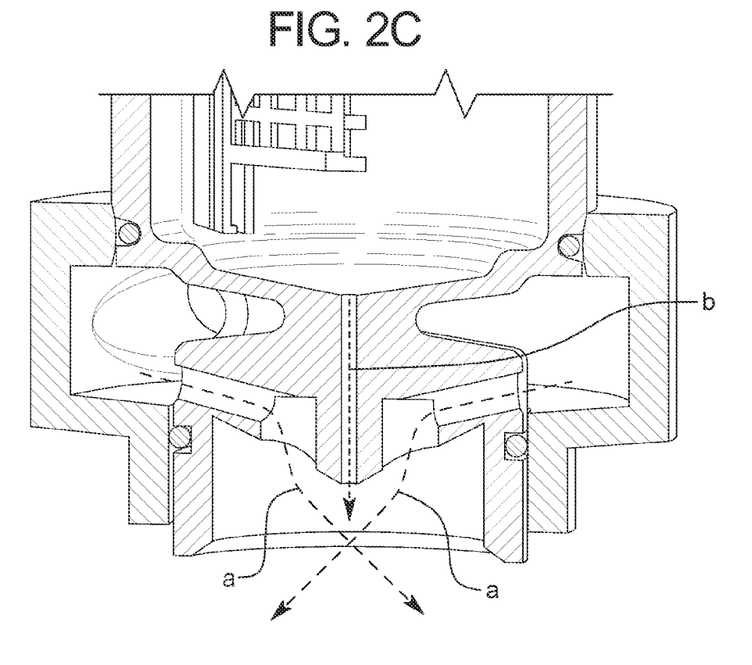
FIG. 2C is a magnified view of the bottom of FIG. 2 illustrating the flow of diluent in the annular and dissolution chambers.

The device 10 comprises a second dilution chamber 2. This dilution chamber 2 comprises a top wall 21 and one liquid inlet 22 through said top wall that is the liquid delivery outlet 12 of the first dissolution chamber 1. This dilution chamber 2 comprises also comprises diluent inlets 23 configured for introducing a diluent in the second dilution chamber 2 and mixing said diluent with the liquid flowing from the first chamber 1. As illustrated in FIGS. 2B and 2B, the diluent inlets 23 of the second dilution chamber 2 are positioned closed to the liquid inlet 22, and preferably they are positioned around the liquid inlet 22. Due to this position the diluent flows emerging from the diluent inlets 23 of the second dilution chamber efficiently mix with the liquid delivered through the liquid inlet 23. Consequently, when a beverage is produced in the first dissolution chamber 1, said beverage combines with the diluent in the dilution chamber 2 to form a homogeneous stream of diluted beverage as illustrated by the arrows in FIG. 2C. This stream is homogeneous in terms of flow and colour, it does not have any stripping effect.

Figure 3:
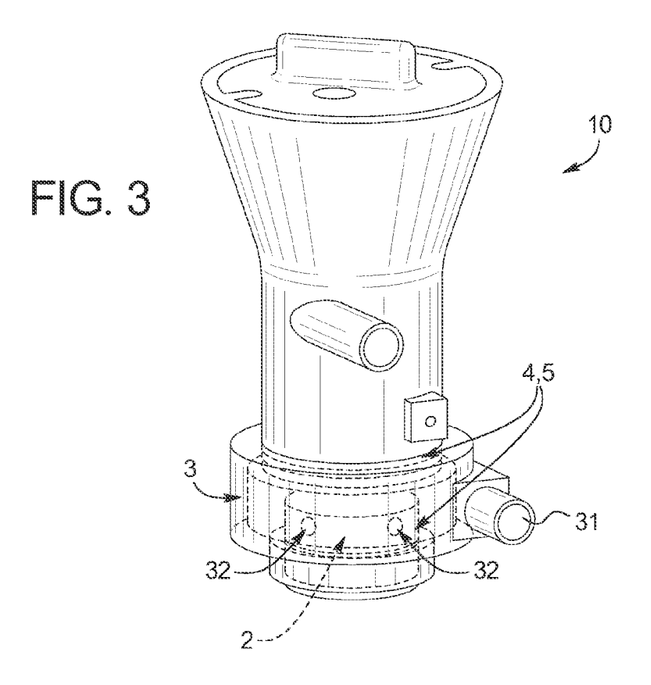
FIG. 3 is the beverage production device of FIG. 1 except that the annular chamber has been made transparent.

The diluent is introduced in the second dilution chamber through an annular chamber 3 that comprises one and several diluent outlet 32 connected to the diluent inlets 23 of the second dilution chamber. Preferably the several diluent outlets 32 are uniformly disposed around the liquid inlet 22. FIG. 3 illustrates the device 10 with a transparent annular chamber 3; the diluent inlet 31 is preferably tangentially oriented in the ring of the chamber. The dilution chamber 3 comprises a downward wall 33.

According to the preferred embodiment, for each diluent outlet 32 of the annular chamber connected to one diluent inlet 23 disposed the section of the diluent outlet is smaller than the section of the diluent inlet. As illustrated in FIG. 2B these sections are circular and the diameter D of the diluent inlets 23 are greater than the diameter d of the diluent outlets 32. Due to this difference of sections, several advantages are obtained. This feature avoids build-up of backpressure which could disrupt the foam of the beverage flowing from the dissolution chamber 1; then the foam is preserved until the drinking container. Besides the dispensing time of the final beverage can be decreased as diluent can be added to the beverage flowing from the dissolution chamber more quickly. Moreover the flow of diluent introduced by the diluent inlets 23 remains gentle and keeps the generation of undesired large bubbles to the minimum; moreover it does not create splashing.

Figure 4:
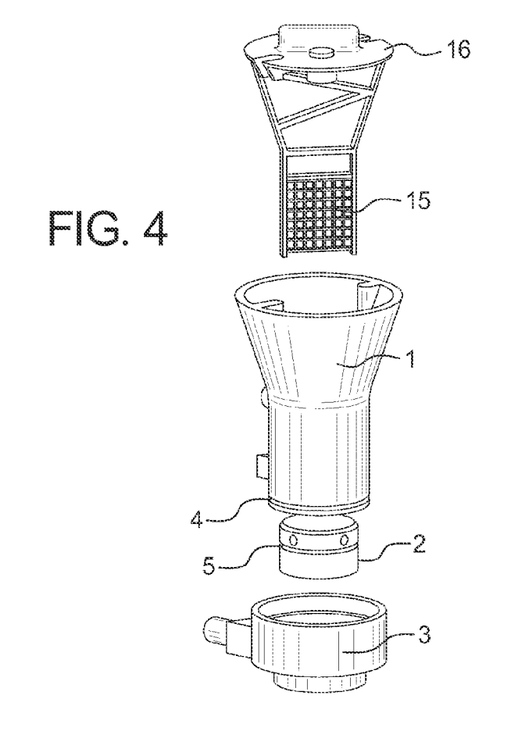
FIG. 4 is an exploded view of the beverage production device of FIG. 1.

FIG. 4 illustrates the assembly of the different elements of the device 10. The cover is placed on the top of the first dissolution chamber 1 and the annular chamber 3 is slid around the second dilution chamber 2 and the bottom of the first dissolution chamber 1. Two o-rings 4, 5 enable the tightness assembly of the annular chamber 3 around the two other chambers 1, 2.

Figure 5:
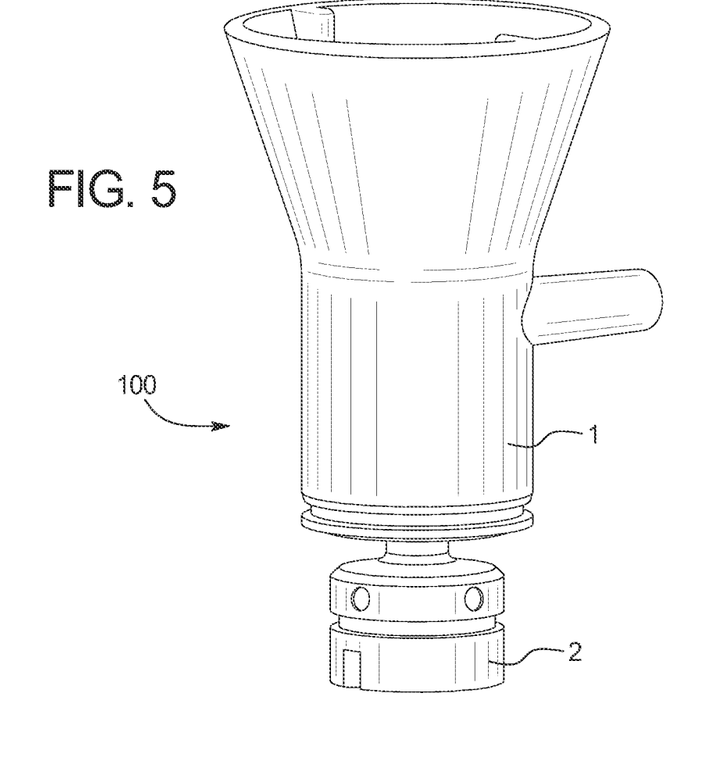
FIG. 5 is a perspective view of the first and the second chambers.
Figure 6:
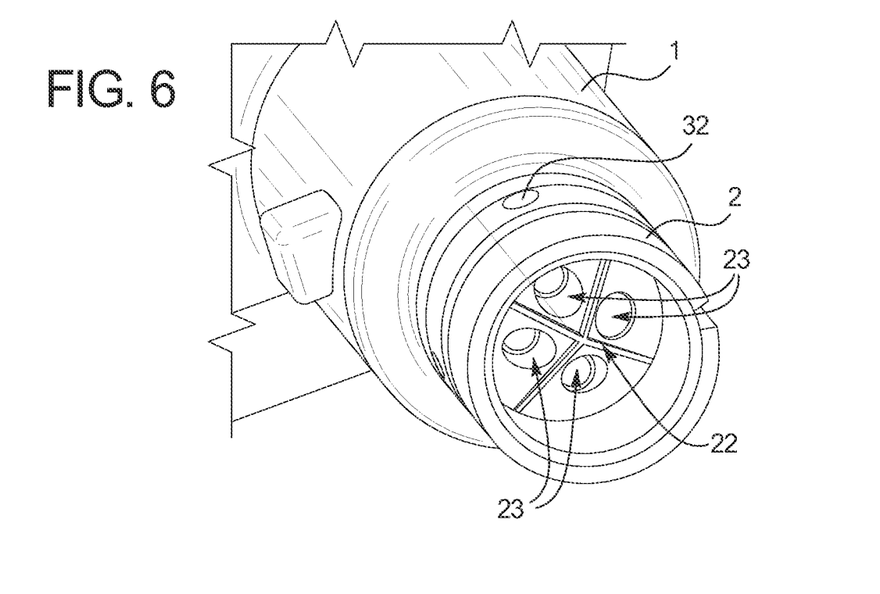
FIG. 6 is a bottom view of the first and the second chambers.

FIG. 5 shows the preferred embodiment in which the first dissolution chamber 1 and the second dissolution chamber (2 are made of one single piece of material 100.

FIG. 5 shows the preferred embodiment in which the liquid delivery outlet 12 of the first dissolution chamber presents a cross shape section that is two crossed slits. Besides in this embodiment the second dilution chamber 2 comprises four diluent inlets 23 uniformly positioned between the cross axes of the liquid delivery outlet cross shape section.

Figure 7:
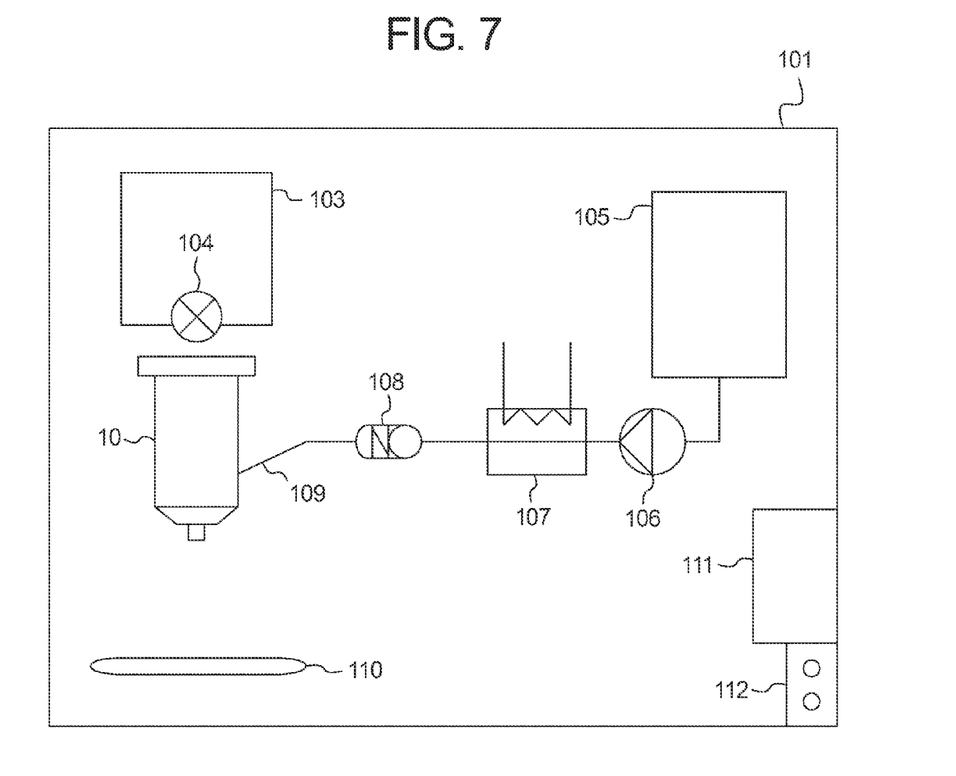
FIG. 7 is a schematic view of a beverage production machine comprising a device according to the invention.

Referring to FIG. 7, a beverage production machine 101 is represented that includes a device 10 of the invention for producing a beverage from a soluble beverage ingredient and a diluent entering the device. The beverage production machine 101 comprises a reservoir of soluble concentrate 103—that can be a liquid or powder—placed above the device 10 which is coupled with a dosing system 104. The dosing system has the primary function to meter upon request doses of concentrate into the device 10. The reservoir can be a hopper which is permanent or a disposable package containing the concentrate. The dosing system 104 can be any suitable system such as a dosing screw or a reciprocating dosing piston for a powder or peristaltic pump for a liquid concentrate. The dosing technology is also of course dependent on the nature of the soluble ingredient. The device 10 is fed upon request with concentrate manually or automatically as prompted by a controller 111 and command 112. One can notice that the reservoir and dosing system are optional in the machine. Therefore, the device could be fed manually using a scoop, for instance.

A diluent feed circuit is provided in the machine to be able to feed the device 10 with diluent, more particularly, hot water. For that, a water reservoir 105 is provided that can be replenished with fresh water. A water pump 106 transports the diluent from the reservoir 105 to a water heating system 107 such as a thermoblock or a cartridge type heater and to eventually a non-return valve 108. The pump can be any type of pump such as a piston pump, diaphragm pump or a peristaltic pump. Finally water is fed into the device by a tube means 109.

As illustrated in FIG. 7, the device 10 can be placed directly above a service tray 110 onto which is placed a receptacle to receive the frothed liquid.

A controller 111 can be further provided to coordinate dosing of the concentrate by the dosing system 104 and diluent by the pump 106 upon the user actuating or being prompted to press a command 112 on the machine.

Figure 8A:
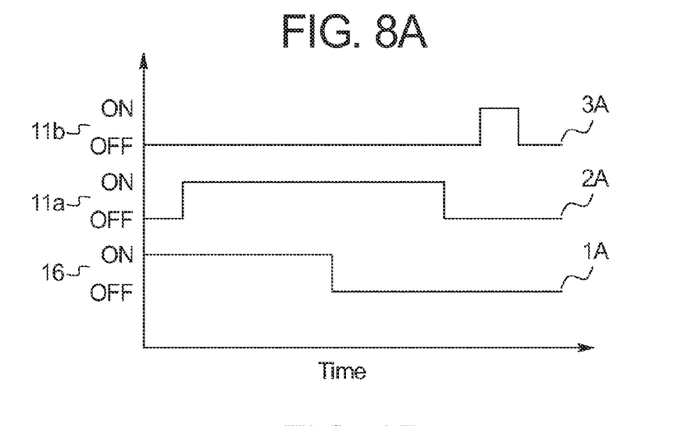
FIGS. 8A, 8B, 8C are curves illustrating the method of production of different sizes of beverages with the device of the present invention.

FIG. 8A illustrates the sequential introduction of the coffee liquid concentrate and the diluent in the device of the above figures for producing an espresso coffee:
  Curve 1A represents the opening of the coffee liquid concentrate valve associated to the beverage concentrate inlet 16 with time,
  Curve 2A represents the opening of the diluent (hot water) valve associated to the bottom dissolution chamber diluent inlet 11a,
  Curve 3A represents the opening of the diluent (hot water) valve associated to the top dissolution chamber diluent inlet 11b.

During this beverage production a small size coffee with crema on the top is produced in the dissolution chamber 1 and delivered in a drinking cup. No diluent is introduced in the dilution chamber 2. The diluent introduced at the end of the production though bottom diluent inlet 11a (curve 3A) enables rinsing of the dissolution chamber. Preferably the bottom diluent inlet 11a of the dissolution chamber is connected to a supply of pressurized water so that crema is created on the top of the beverage.

Figure 8B:
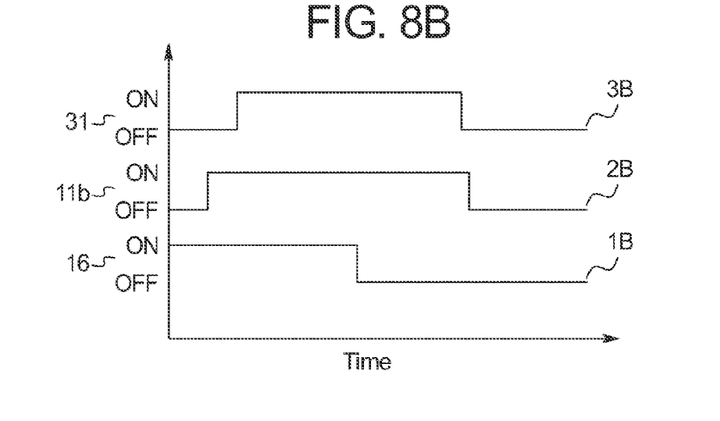

FIG. 8B illustrates the sequential introduction of the coffee liquid concentrate and the diluent in the device of the above figures for producing a black coffee:
  Curve 1B represents the opening of the coffee liquid concentrate valve associated to the beverage concentrate inlet 16 with time,
  Curve 2B represents the opening of the diluent (hot water) valve associated to the top dissolution chamber diluent inlet 11b,
  Curve 3B represents the opening of the diluent (hot water) valve associated to the annular chamber diluent inlet 31.

During this beverage production a big size coffee without crema on the top is produced: in the dissolution chamber 1 the beverage concentrate is dissolved with a first volume of diluent introduced through top diluent inlet 11b and delivered in the dilution chamber 2 where a second volume of diluent is simultaneously introduced. Preferably the bottom diluent inlet 11b of the dissolution chamber is connected to a supply of water fed by gravimetry so that no foam is created on the top of the beverage.

Figure 8C:
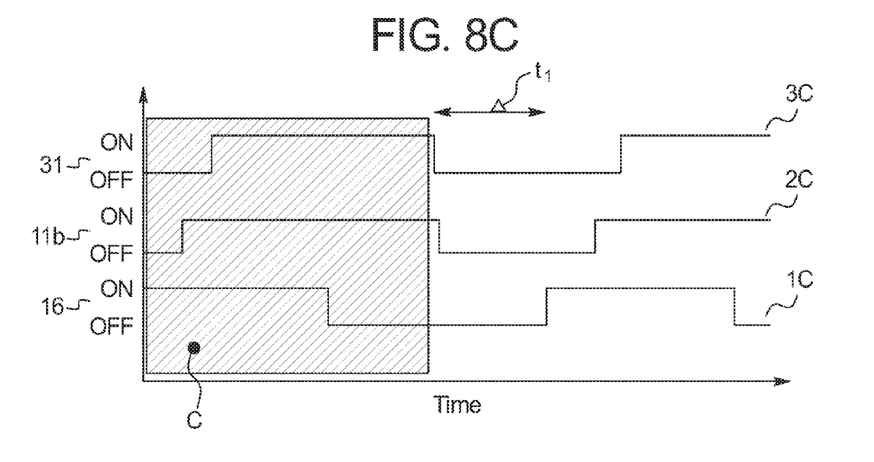

FIG. 8C illustrates the sequential introduction of the coffee liquid concentrate and the diluent in the device of the above figures for producing an American coffee carafe:
  Curve 1C represents the opening of the coffee liquid concentrate valve associated to the beverage concentrate inlet 16 with time,
  Curve 2C represents the opening of the diluent (hot water) valve associated to the top dissolution chamber diluent inlet 11b,
  Curve 3C represents the opening of the diluent (hot water) valve associated to the annular chamber diluent inlet 31.

During this beverage production a carafe of American coffee without crema on the top is produced: in the dissolution chamber 1 the beverage concentrate is dissolved with a first volume of diluent introduced through top diluent inlet 11b and delivered in the dilution chamber 2 where a second volume of diluent is simultaneously introduced. This cycle C is repeated several times with certain time $t_1$ delay between each cycle to help drain the beverage from the dissolution chamber 1 and to avoid overflow.

The present invention presents the advantage of enabling the production of different beverage differing by their sizes and the presence of foam or not with the same device.

The device presents also the advantage of delivering large size beverages at fast dispense rate, in particular for foodservice application.

The invention claimed is:

1. A beverage production device comprising:
   a dissolution chamber configured to produce a beverage by mixing a beverage concentrate and a diluent, the dissolution chamber comprising
      at least one first diluent inlet,
      at least one liquid delivery outlet, and
      a bottom wall, the at least one liquid delivery outlet set in the bottom wall; and
   a dilution chamber comprising
      a top wall,
      at least one liquid inlet through the top wall, the at least one liquid inlet being the at least one liquid delivery outlet of the dissolution chamber, and
      at least one second diluent inlet configured to introduce a diluent in the dilution chamber and mix the diluent with a liquid flowing from the at least one liquid inlet through the top wall,
   the dilution chamber is surrounded by an annular chamber comprising the at least one second diluent inlet and at least one diluent outlet connected to the at least one second diluent inlet of the dilution chamber.

2. The beverage production device according to claim 1, wherein in the dilution chamber, the at least one second diluent inlet is closed to the at least one liquid inlet through the top wall.

3. The beverage production device according to claim 1, wherein the at least one second diluent inlet comprises inlets positioned around the at least one liquid inlet through the top wall.

4. The beverage production device according to claim 1, wherein the at least one diluent outlet of the annular chamber is connected to the at least one second diluent inlet uniformly positioned around the at least one liquid inlet through the top wall of the dilution chamber.

5. The beverage production device according to claim 4, wherein for each of the at least one diluent outlet of the annular chamber connected to the at least one second diluent inlet positioned around the at least one liquid inlet of the dilution chamber, a cross section of the at least one diluent outlet is smaller than a cross section of the at least one second diluent inlet.

6. The beverage production device according to claim 1, wherein the at least one liquid delivery outlet of the dissolution chamber presents a cross shape section comprising two crossed slits.

7. The beverage production device according to claim 6, wherein the dilution chamber comprises four diluent inlets uniformly positioned between cross axes of the cross shape section of the at least one liquid delivery outlet of the dissolution chamber.

8. The beverage production device according to claim 1, wherein the dissolution chamber and the dilution chamber are made of one single piece of material.

9. A beverage production device comprising:
   a dissolution chamber configured to produce a beverage by mixing a beverage concentrate and a diluent and to froth the beverage, the dissolution chamber comprising
      at least one first diluent inlet,
      at least one liquid delivery outlet, and
      a bottom wall, the at least one liquid delivery outlet set in the bottom wall; and
   a dilution chamber comprising
      a top wall,
      at least one liquid inlet through the top wall, the at least one liquid inlet being the at least one liquid delivery outlet of the dissolution chamber, and
      at least one second diluent inlet configured to introduce a diluent in the dilution chamber and mix the diluent with a liquid flowing from the at least one liquid inlet through the top wall.

10. A beverage production device comprising:
    a dissolution chamber configured to produce a beverage by mixing a beverage concentrate and a diluent, the dissolution chamber comprising
       at least one first diluent inlet,
       at least one liquid delivery outlet,
       a bottom wall, the at least one liquid delivery outlet set in the bottom wall, and
       a longitudinal upward wall, the at least one first diluent inlet is provided through the longitudinal upward wall and dimensioned and oriented to direct a jet of diluent in the dissolution chamber, and the at least one liquid delivery outlet in the bottom wall is configured to enable the liquid to rise up along a side of the longitudinal upward wall by the jet of diluent entering the dissolution chamber; and
    a dilution chamber comprising
       a top wall,
       at least one liquid inlet through the top wall, the at least one liquid inlet being the at least one liquid delivery outlet of the dissolution chamber, and
       at least one second diluent inlet configured to introduce a diluent in the dilution chamber and mix the diluent with a liquid flowing from the at least one liquid inlet through the top wall.

11. A beverage production device comprising: a dissolution chamber configured to produce a beverage by mixing a beverage concentrate and a diluent, the dissolution chamber comprising
    at least one first diluent inlet,
    at least one liquid delivery outlet, and
    a bottom wall, the at least one liquid delivery outlet set in the bottom wall,
    a total surface area of the at least one liquid delivery outlet of the dissolution chamber is determined so that an evacuation flow rate by gravity of the liquid through the at least one liquid delivery outlet is lower than a filling flow rate of the dissolution chamber in diluent through the at least one first diluent inlet; and
    a dilution chamber comprising
       a top wall,
       at least one liquid inlet through the top wall, the at least one liquid inlet being the at least one liquid delivery outlet of the dissolution chamber, and
       at least one second diluent inlet configured to introduce a diluent in the dilution chamber and mix the diluent with a liquid flowing from the at least one liquid inlet through the top wall.

12. The beverage production device according to claim 10, wherein the dissolution chamber comprises
    a sieve placed at least partially across the dissolution chamber,
    a plurality of first diluent inlets comprising two diluent inlets located at different heights of the longitudinal upward wall, a third diluent inlet, and a fourth diluent inlet placed below the third diluent inlet and facing the sieve.

13. The beverage production device according to claim 12, wherein the fourth diluent inlet facing the sieve is horizontally oriented.

14. The beverage production device according to claim 12, wherein the sieve is inclined at an angle of at least 20° with respect to the vertical.

15. The beverage production device according to claim 12, wherein the sieve is removable from the dissolution chamber.

16. The beverage production device according to claim 1, wherein the dissolution chamber further comprises a cover.

17. The beverage production device according to claim 16, wherein the cover comprises a beverage concentrate inlet.

18. The beverage production device according to claim 12, wherein the dissolution chamber further comprises a cover, and the sieve is attached to the cover.

19. The beverage production device according to claim 18, wherein the cover comprises a beverage concentrate inlet.

20. A method for producing a beverage comprising:
   providing a beverage production device comprising a dissolution chamber, at least one first diluent inlet, at least one liquid delivery outlet, a bottom wall, the at least one liquid delivery outlet set in the bottom wall, a dilution chamber comprising a top wall, at least one liquid inlet through the top wall, the at least one liquid inlet being the at least one liquid delivery outlet of the dissolution chamber, and at least one second diluent inlet configured to introduce a diluent in the dilution chamber and mix the diluent with a liquid flowing from the at least one liquid inlet through the top wall;
   dosing the dissolution chamber with a beverage concentrate;
   feeding a first diluent through at least one first diluent inlet of the dissolution chamber to dissolve the beverage concentrate into a concentrated beverage;
   feeding a second diluent through the at least one second diluent inlet of the dilution chamber;
   stopping feeding the first diluent inside the dissolution chamber and stopping feeding the second diluent inside the dilution chamber; and
   draining the beverage.

21. The method according to claim 20, wherein the beverage concentrate is a soluble coffee ingredient.

22. The method according to claim 20, further comprising rinsing the dissolution chamber by passing the first diluent through the at least one first diluent inlet of the dissolution chamber after draining of the beverage, and draining the the first diluent after rinsing.

23. A method for producing a beverage comprising:
   providing a beverage production device comprising a dissolution chamber, at least one first diluent inlet, at least one liquid delivery outlet, a bottom wall, the at least one liquid delivery outlet set in the bottom wall, a dilution chamber comprising a top wall, at least one liquid inlet through the top wall, the at least one liquid inlet being the at least one liquid delivery outlet of the dissolution chamber, and at least one second diluent inlet configured to introduce a diluent in the dilution chamber and mix the diluent with a liquid flowing from the at least one liquid inlet through the top wall;
   dosing the dissolution chamber with a beverage concentrate;
   feeding a first diluent through at least one first diluent inlet of the dissolution chamber to dissolve the beverage concentrate into a concentrated beverage;
   feeding a second diluent through the at least one second diluent inlet of the dilution chamber;
   stopping feeding the first diluent inside the dissolution chamber and stopping feeding the second diluent inside the dilution chamber; and
   draining the beverage,
   one of the at least one first diluent inlet of the dissolution chamber is supplied with a diluent under pressure, and another of the at least one first diluent inlet of the dissolution chamber is supplied with a diluent fed under gravity flow.

24. The method according to claim 20, wherein the first diluent and the second diluent are both water.

* * * * *